US009910702B2

(12) United States Patent
Cho et al.

(10) Patent No.: US 9,910,702 B2
(45) Date of Patent: *Mar. 6, 2018

(54) CONTINUOUS OPTIMIZATION OF ARCHIVE MANAGEMENT SCHEDULING BY USE OF INTEGRATED CONTENT-RESOURCE ANALYTIC MODEL

(71) Applicant: International Business Machines Corporation, Armonk, NY (US)

(72) Inventors: Brian Cho, Savoy, IL (US); Kavita Chavda, Roswell, GA (US); Mickey Iqbal, Tucker, GA (US); Seshashayee S. Murthy, Yorktown Heights, NY (US); Sandeep M. Uttamachandani, San Jose, CA (US); Pin Zhou, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 14/818,854

(22) Filed: Aug. 5, 2015

(65) Prior Publication Data

US 2015/0339160 A1 Nov. 26, 2015

Related U.S. Application Data

(63) Continuation of application No. 13/936,275, filed on Jul. 8, 2013, which is a continuation of application
(Continued)

(51) Int. Cl.
*G06F 9/46* (2006.01)
*G06F 9/48* (2006.01)
*G06F 11/14* (2006.01)

(52) U.S. Cl.
CPC ........ *G06F 9/4881* (2013.01); *G06F 11/1402* (2013.01)

(58) Field of Classification Search
None
See application file for complete search history.

(56) References Cited

U.S. PATENT DOCUMENTS 6,460,068 B1 * 10/2002 Novaes ............... G06F 11/3688
714/E11.208
6,732,123 B1 5/2004 Moore et al.
(Continued)

FOREIGN PATENT DOCUMENTS

JP H0675786 3/1994
JP 2006268509 10/2006
WO WO2008132924 11/2008

OTHER PUBLICATIONS

Dean, J. et al. Mapreduce: Simplified Data Processing on Large Clusters. In OSDI'04: Proceedings of the 6th conference on Symposium on Operating Systems Design & Implementation, pp. 10-10, Berkeley, CA, USA, 2004. USENIX Association.
(Continued)

*Primary Examiner* — Adam Lee
(74) *Attorney, Agent, or Firm* — Schmeiser, Olsen & Watts, LLP; Michael Petrocelli

(57) ABSTRACT

A method and associated system for continuously optimizing data archive management scheduling. A flow network is modeled, which creates vertexes organized in multiple levels and creating multiple edges sequentially connecting the vertexes of the multiple levels. The multiple levels consist of N+1 levels denoted as $LEVEL_0, LEVEL_1, \ldots, LEVEL_N$, wherein N is at least 2, wherein $LEVEL_0$ includes a source vertex, wherein $LEVEL_1$ includes at least one task vertex associated with at least one archive management task, wherein $EDGE_K$ is directed from the vertex of $LEVEL_{K-1}$ to
(Continued)

the vertex of $LEVEL_K$ for K=1, ..., N, wherein $EDGE_1$ indicates that a first task associated with a first task vertex of $LEVEL_1$ is scheduled by a job scheduler, and wherein $EDGE_1$ has a first weight equal to a time unit to perform the first task.

15 Claims, 6 Drawing Sheets

Related U.S. Application Data

No. 13/569,620, filed on Aug. 8, 2012, now Pat. No. 8,527,998, which is a continuation of application No. 12/631,247, filed on Dec. 4, 2009, now Pat. No. 8,276,148.

(56) References Cited

U.S. PATENT DOCUMENTS

| | | | |
|---|---|---|---|
| 6,886,047 B2 | 4/2005 | Leong et al. | |
| 7,246,254 B2 | 7/2007 | Alur et al. | |
| 7,469,143 B2 | 12/2008 | Jain et al. | |
| 7,502,859 B2* | 3/2009 | Inoue | G06F 9/5044 702/188 |
| 7,979,301 B1* | 7/2011 | Franco | G06Q 30/0202 705/7.31 |
| 8,042,167 B2 | 10/2011 | Fulp et al. | |
| 8,798,084 B2* | 8/2014 | Pratt, Jr. | G01D 21/00 370/406 |
| 9,158,581 B2 | 10/2015 | Cho et al. | |
| 2003/0023585 A1* | 1/2003 | Castelli | G06F 17/30277 |
| 2004/0044585 A1* | 3/2004 | Franco | G06Q 30/016 705/304 |
| 2004/0078538 A1* | 4/2004 | Dutt | G06F 8/451 711/168 |
| 2004/0078785 A1 | 4/2004 | Dutt et al. | |
| 2005/0108696 A1 | 5/2005 | Dai et al. | |
| 2005/0137732 A1 | 6/2005 | Chao et al. | |
| 2005/0166082 A1 | 7/2005 | Williams et al. | |
| 2006/0010449 A1 | 11/2006 | Flower et al. | |
| 2006/0265489 A1 | 11/2006 | Moore | |
| 2006/0274070 A1 | 12/2006 | Herman et al. | |
| 2006/0288346 A1 | 12/2006 | Santos et al. | |
| 2007/0074217 A1 | 3/2007 | Rakvic et al. | |
| 2007/0174101 A1 | 7/2007 | Li et al. | |
| 2007/0198971 A1* | 8/2007 | Dasu | G06F 8/433 717/140 |
| 2007/0250663 A1 | 10/2007 | Welsh et al. | |
| 2008/0218518 A1 | 9/2008 | Zhou et al. | |
| 2009/0007101 A1 | 1/2009 | Azar et al. | |
| 2009/0216867 A1* | 8/2009 | Pusateri | H04L 41/022 709/222 |
| 2010/0214313 A1 | 8/2010 | Herman et al. | |
| 2010/0281166 A1 | 11/2010 | Buyya et al. | |
| 2010/0325621 A1 | 12/2010 | Andrade et al. | |
| 2011/0067030 A1 | 3/2011 | Isard et al. | |
| 2011/0138391 A1 | 6/2011 | Cho et al. | |
| 2013/0298131 A1 | 11/2013 | Cho et al. | |

OTHER PUBLICATIONS

Edmonds, J. et al. Theoretical improvements in algorithmic efficiency for network flow problems. J. ACM, 19(2):248-264, Apr. 1972.

Fleischer, L. Faster algorithms for the quickest transshipment problem with zero transit times. In Proceedings of ACM-SIAM Symposium on Discrete Algorithms (SODA), pp. 147-156, San Francisco, CA, USA, Jan. 1998.

Ko, S. et al. New worker-centric scheduling strategies for data-intensive grid applications. In Proceedings of Middleware, pp. 121-142, 2007.

Lenstra, J. et al. Approximation algorithms for scheduling unrelated parallel machines. Mathematical Programming, 46(1):259-271, 1990.

Olston, C. et al. Automatic optimization of parallel dataflow programs. In Proceedings of the USENIX Annual Technical Conference, 2008.

Ranganathan, K. et al. Decoupling computation and data scheduling in distributed data-intensive applications. In Proceedings of High Performance Distributed Computing (HPDC), pp. 352-358, 2002.

Stone, Harold S., "Multiprocessor Scheduling with the Aid of Network Flow Algorithms", IEEE Transactions on Software Engineering, vol. SE-3, No. 1, Jan. 1997, XP002628600, pp. 85-93.

Notice of Allowance (dated May 14, 2012) for U.S. Appl. No. 12/631,247, filed Dec. 4, 2009.

Japanese Office Action dated Nov. 11, 2014, 2 pages.

Vydyanathan et al., An Integrated Approach to Locality-Conscious Processor Allocation and Scheduling of Mixed=Parallel Applications, IEEE Transactions on Parallel and Distributed Systems, vol. 20, No. 8, Aug. 2009, pp. 1158-1172.

* cited by examiner

CONTINUOUS OPTIMIZATION OF ARCHIVE MANAGEMENT SCHEDULING BY USE OF INTEGRATED CONTENT-RESOURCE ANALYTIC MODEL

This application is a Continuation application claiming priority to Ser. No. 13/936,275, filed Jul. 8, 2013, which is a continuation of Ser. No. 13/569,620, filed Aug. 8, 2012, U.S. Pat. No. 8,527,998, issued Sep. 3, 2013, which is a Continuation of Ser. No. 12/631,247, filed Dec. 4, 2009, U.S. Pat. No. 8,276,148, issued Aug. 14, 2012.

BACKGROUND OF THE INVENTION

The present invention discloses a system and associated method for continuously optimizing tasks based on integrated content-resource management semantics. Conventional task optimization methods employ management semantics based on either software/data content or hardware resources. An enterprise computing environment such as a data center needs continuous and dynamic optimization of management tasks due to service performance requirement, vast amount of data, and limited time available for maintenance.

BRIEF SUMMARY

According to one embodiment of the present invention, a method for continuously optimizing data archive management scheduling comprises: a job scheduler receiving inputs from an archive management system, wherein the inputs comprise task information, replica placement data, infrastructure topology data, and resource performance data; modeling a flow network from the received inputs, such that the flow network represents data content, software programs, physical devices, and communication capacity of the archive management system, and such that an optimal path of the flow network from a task of at least one archive management task to a worker program of the archive management system represents an optimal initial schedule for the worker program to perform the task; a processor of a computer system computing the optimal initial schedule from the optimal path in the flow network; transferring the computed optimal initial schedule to the archive management system to perform the optimal initial schedule; receiving monitoring results of operations of the transferred optimal initial schedule from the archive management system; creating an adjusted schedule as a result of dynamically adjusting the optimal initial schedule based on the received monitoring results; and transferring the adjusted schedule to the archive management system to perform the adjusted schedule such that the archive management system generates new monitoring results of operations of the transferred adjusted schedule.

According to one embodiment of the present invention, a computer program product comprises a computer readable memory unit that embodies a computer readable program code. The computer readable program code contains instructions that, when run by a processor of a computer system, implement a method for continuously optimizing data archive management scheduling.

According to one embodiment of the present invention, a computer system comprises a processor and a computer readable memory unit coupled to the processor, wherein the computer readable memory unit containing instructions that, when run by the processor, implement a method for continuously optimizing data archive management scheduling.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for continuously optimizing data archive management scheduling.

DETAILED DESCRIPTION

Figure 1A:
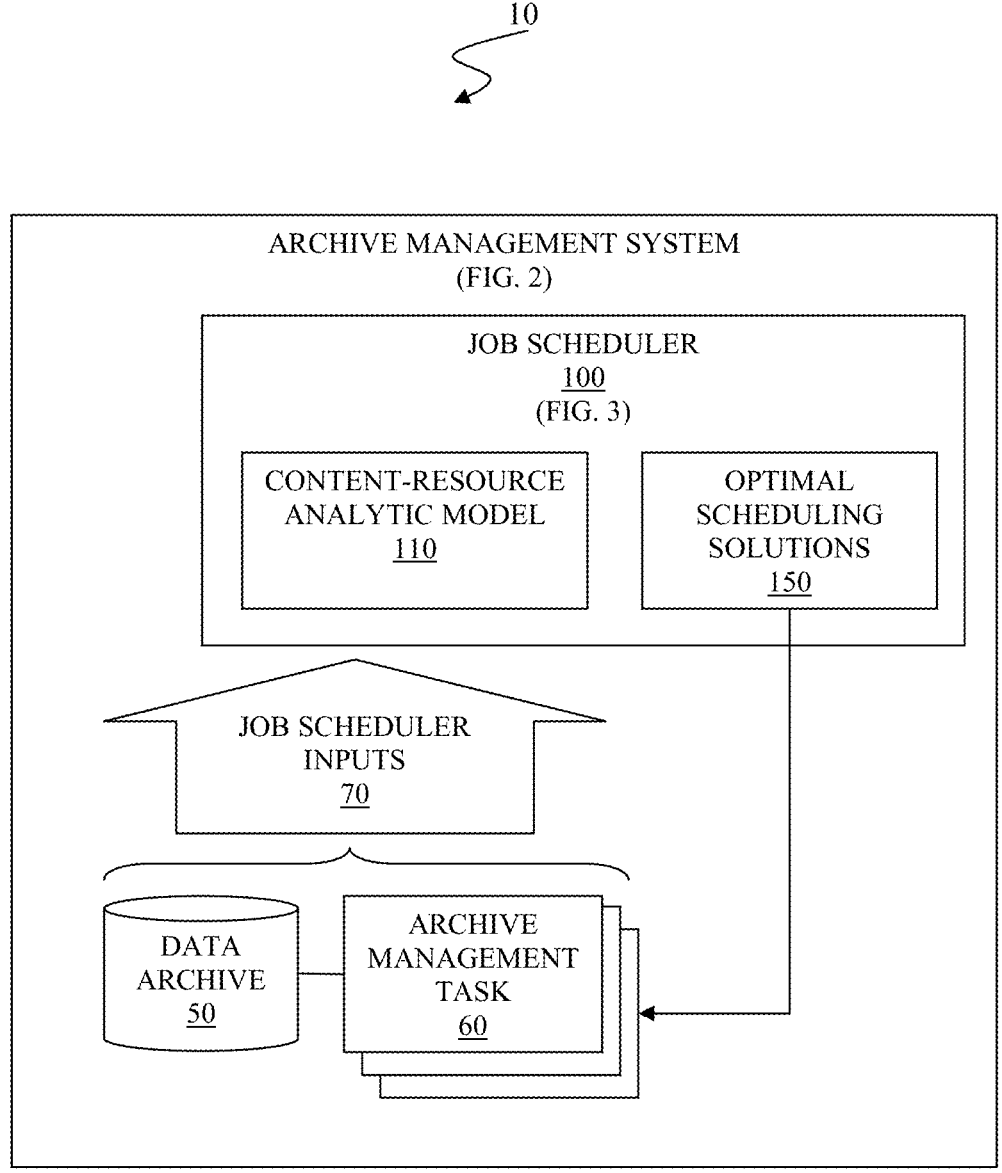
FIG. 1A illustrates an archive management system 10 for continuously optimizing data archive management scheduling, in accordance with embodiments of the present invention.

FIG. 1A illustrates an archive management system 10 for continuously optimizing data archive management scheduling, in accordance with embodiments of the present invention.

The archive management system 10 comprises a data archive 50, archive management tasks 60, job scheduler inputs 70, and a job scheduler 100. The archive management system 10 is employed in an enterprise utilizing the data archive 50 to provide data/computing services to users of the enterprise. Examples of the enterprise may be, inter alia, data center, etc. Examples of data/computing services may be, inter alia, data archival and provisioning, data backup, data mining for business intelligence (BI), etc. In this specification, the term "content" indicates software/data component of the archive management system 10. In management semantics, content management is primarily related to retention and utilization of massive amount of data in the data archive 50.

In this specification, the term "resource" indicates a physical device/hardware of the archive management system 10. In management semantics, main purpose of resource management is to maximize availability of the services by keeping the resources fault-tolerant. Conventional disaster recovery (DR) techniques are utilized for various resource configurations pursuant to service requirements such as Recovery Point Objective (RPO), Recovery Time Objective (RTO), etc. Examples of the resources may be, inter alia, servers, storage devices, communication equipments supporting network bandwidths, etc. The servers employed in the archive management system 10 are enterprise-level servers supporting sophisticated virtualization, management and reliability services. One example of the servers may be, inter alia, VMware® ESX/ESXi server-infrastructure, etc. (VMware is a registered trademark of VMware, Inc., in the United States) The storage devices employed in the archive management system 10 are persistent storage devices that store the data content, the virtualization kernel and relevant files.

The data/computing services of the enterprise requires extensive amount of maintenance activities which must be performed extra to the actual data/computing services required by the users. Because the data/computing services must meet a certain performance requirement level set forth in service agreements between the users and the enterprise, the maintenance activities are usually performed during a period of lower service demands from the users. However, because the enterprise is also required to make the services available to users for extended amount of time, it is impractical to set a time window exclusive for maintenance activities without providing services to users. To perform necessary maintenance activities for ever-growing amount of data in the data archive 50 within a limited amount of time is imperative to the archive management system 10.

The data archive 50 stores software applications for the data/computing services and data content.

The archive management tasks 60 are processes that perform archive management/maintenance activities as scheduled by the job scheduler 100. Examples of the archive management/maintenance activities may be, inter alia, provisioning, disaster recovery (DR) maintenance, service requirement compliance, backup operations for various DR technologies, updating indexes of newly generated data content that require content parsing and keyword lookup, Hierarchical Storage Management (HSM) that moves inactive data to low-cost storage tiers, etc.

The job scheduler inputs 70 comprise task information, replica placement data, infrastructure topology data, and resource performance data.

The task information comprises a respective access path to objects necessary to perform a task, a respective operation to be performed on the objects, and system attributes that are useful for task scheduling such as object size. The tasks performs functions of, inter alia, content archiving, indexing, data mining for Business Intelligence (BI) purposes, by use of available storage-server-network resources for primary data as well as replicas created for disaster recovery. All tasks require a relatively uniform amount of resources.

The replica placement data comprises addresses of replicas of primary data within the data archive 50 that have been created for the purpose of disaster recovery.

The infrastructure topology data represent how a server is connected to a storage device volume within the data archive 50, which is a path between the server and the storage device volume through elements of the data archive 50. The infrastructure topology data are collected by a part of the data archive 50 that collects and maintains management data. The infrastructure topology data is represented in a quintuple <Hostname, Initiator Port WWN, Fabric WWN, Target Port WWN, Volume>, wherein Hostname is a first identifier for a server, wherein Initiator Port WWN is a second identifier for an initial port, wherein Fabric WWN is a third identifier for a network fabric, wherein Target Port WWN is a fourth identifier for a target port, and wherein Volume is a fifth identifier for a storage device volume. A World Wide Name (WWN) or World Wide Identifier (WWID) is a unique identifier in a Fiber channel or Serial attached Small Computer System Interface (SCSI) storage network. Each WWN is an eight (8) byte number combining first three (3) bytes derived from an Institute of Electrical and Electronics Engineers (IEEE) Organizationally Unique Identifier (OUI) and next five (5) bytes derived from vendor-supplied information. WWNs are built into devices similar to Ethernet Media Access Control (MAC) address. The network fabric indicates a network topology where network nodes are connect with each other via one or more network switches, as used in telecommunication field.

The resource performance data comprises performance metrics of resources such as clock speed, tasks per second, bytes per second, etc. Accuracy of resource performance data regarding relative performance between storage devices and servers, rather than absolute accuracy of respective performance data, affect accuracy of optimal scheduling solutions 150.

The job scheduler 100 creates a content-resource analytic model 110 from the job scheduler inputs 70 and dynamically and continuously generates optimal scheduling solutions 150 by use of the content-resource analytic model 110. See description of FIG. 3, infra, for details of steps performed by the job scheduler 100. In this specification, the terms "scheduling solution," "schedule," and "job schedule" are used interchangeably.

The content-resource analytic model 110 is an analytic model of the archive management system 10 within the job scheduler 100. The content-resource analytic model 110 enables the job scheduler 100 to continuously optimize operations of the archive management tasks 60 and to generate the optimal scheduling solutions 150 comprising an initial schedule and at least one dynamically adjusted schedule.

In conventional system analytics modeling, the resource and the content are separately modeled and managed. Conventional resource management semantics focuses on devices of a system, which utilizes historic performance statistics of the devices and predicts device saturation as a function of total workload. Conventional content management semantics focuses on software application and relevant data to simplify decision making processes for archive management tasks 60.

In contrast with conventional system analytics modeling, the method of the present invention integrates both resource and content in the content-resource analytic model 110 to enable disaster recovery and data protection, and to optimize both resource utilization and content-centric archive management tasks 60. The method of the present invention utilizes existing data redundancy and storage paths among present replicas instead of creating new replicas as in conventional data-intensive job scheduling. In one embodiment of the present invention, the method of the present invention manipulates system parameters for dynamic optimization of the archive management tasks 60 throughout the archive management system 10 for overall performance gain. In another embodiment of the present invention, the method of the present invention utilizes application-specific parameters for selected maintenance tasks of which performance is critical to the overall performance of the archive management system 10.

The method of the present invention is utilized to parallelize data operations and computations for archiving, compliance, business intelligence queries, to discover and correlate application content information with block-level snapshot and mirroring details, to limit archiving workload on the primary data by making it available for other conventional book-keeping operations, and to leverage replicas residing in both a local site and remote sites.

Figure 1B:
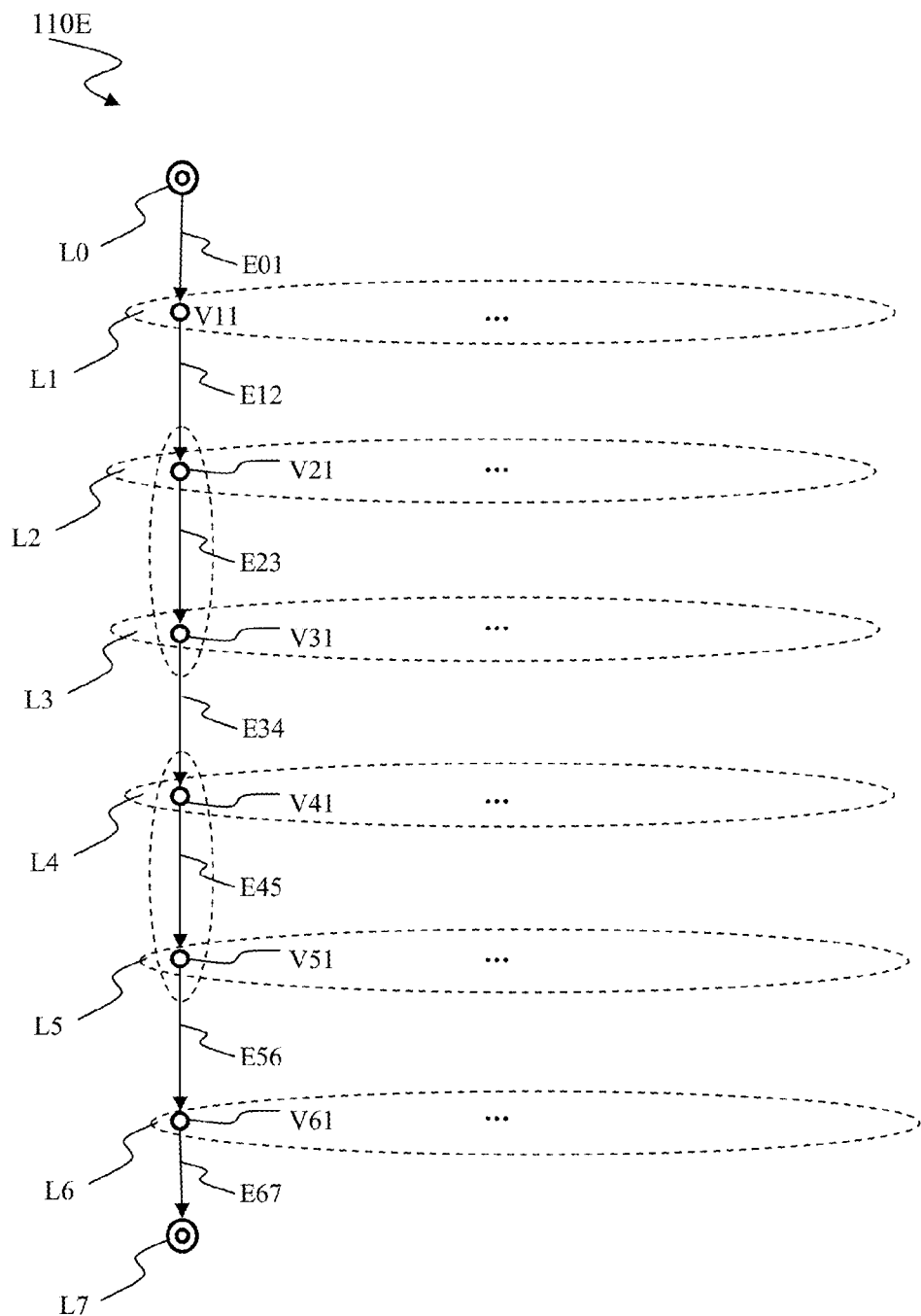
FIG. 1B illustrates a flow network 110E embodiment of the content-resource analytic model created by the job scheduler of the archive management system in FIG. 1A, in accordance with the embodiments of the present invention.

FIG. 1B illustrates a flow network 110E embodiment of the content-resource analytic model created by the job scheduler of the archive management system in FIG. 1A, supra, in accordance with the embodiments of the present invention.

The flow network 110E comprises eight (8) levels indicating respective vertex groups. The flow network 110E further comprises directed edges from LEVEL_k to LEVEL_k+1, wherein k=0 . . . 6.

A source level LEVEL_0 L0 comprises a source vertex of the flow network 110E. A first level LEVEL_1 L1 comprises at least one task vertex that represents an individual task or a task set. Each task vertex in L1 has a respective incoming edge from the source vertex.

A first edge E01 from the source vertex in LEVEL_0 to a task vertex V11 in LEVEL_1 has time capacity (t) that indicates a unit of time required to perform the task associated with the task vertex V11. In one embodiment of the present invention, the time capacity (t) is assigned to 1 uniformly for all tasks in LEVEL_1. In another embodiment of the present invention, the time capacity (t) is assigned to a respective processing time associated with each task in LEVEL_1 to reflect varying time required to process the respective task.

A second level LEVEL_2 L2 comprises at least one volume vertex that represents a respective volume of storage devices. A third level LEVEL_3 L3 comprises said at least one volume vertex. A volume is represented by a pair of volume vertices, V21 in LEVEL_2 and V31 in LEVEL_3.

A second edge E12 from the task vertex V11 in LEVEL_1 to a first volume vertex V21 indicates that the volume stores a latest copy of files necessary to perform the task represented by the task vertex V11. The second edge E12 has a capacity of one (1) that indicates a unit of volume usage of the task represented by the task vertex V11.

A third edge E23 from the first volume vertex V21 to a second volume vertex V31 has a volume throughput capacity indicating a number of tasks that the volume represented by the pair of vertices V21 and V31 can support.

A fourth level LEVEL_4 L4 comprises at least one server vertex that represents a respective server. A fifth level LEVEL_5 L5 comprises said at least one server vertex. A server is represented by a pair of server vertices, V41 in LEVEL_4 and V51 in LEVEL_5.

A fourth edge E34 from the second volume vertex V31 to a first server vertex V41 indicates that the volume of V21 and V31 is physically connected to the server of V41 and V51 via a communication channel. The fourth edge E34 has a communication capacity that indicates throughput of the communication channel between the volume of V21 and V31 and the server of V41 and V51. The communication channel may be a fabric, a network, and combinations thereof. The fourth edge E34 also has a path information of the communication channel between the volume of V21 and V31 and the server of V41 and V51 to enable prompt Storage Area Network (SAN) path construction.

A fifth edge E45 from the first server vertex V41 to a second server vertex V51 has a server throughput capacity indicating computational throughput of the server of V41 and V51, which comprises available processing cycles and memory.

A sixth level LEVEL_6 L6 comprises at least one worker vertex comprising a worker vertex V61 that represents a worker and/or software application.

A sixth edge E56 from the second server vertex V51 to the worker vertex V61 indicates that the server of V41 and V51 hosts the worker represented by the worker vertex 61. The sixth edge E56 has a host capacity indicating a number of workers that run on the server of V41 and V51.

A sink level LEVEL_7 L7 comprises a sink vertex of the flow network 110E. Each worker vertex in the sixth level LEVEL_6 has an outgoing edge to the sink vertex analogous to a seventh edge E67. The seventh edge E67 from the worker vertex V61 to the sink vertex has infinite capacity.

Figure 4:
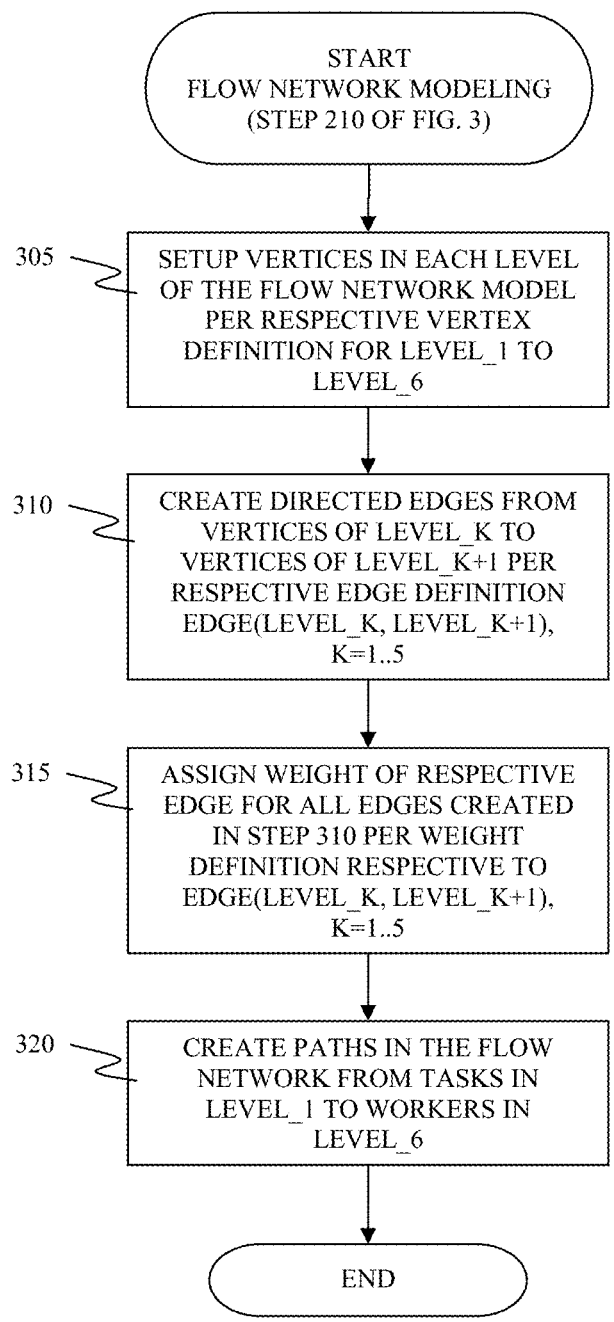
FIG. 4 is a flowchart depicting a method for creating a flow network as an embodiment of the content-resource analytic model, which is performed by the job scheduler in step 210 of FIG. 3, in accordance with the embodiments of the present invention.

See description of FIG. 4 infra for steps creating a flow network pursuant to the definitions.

Figure 2:
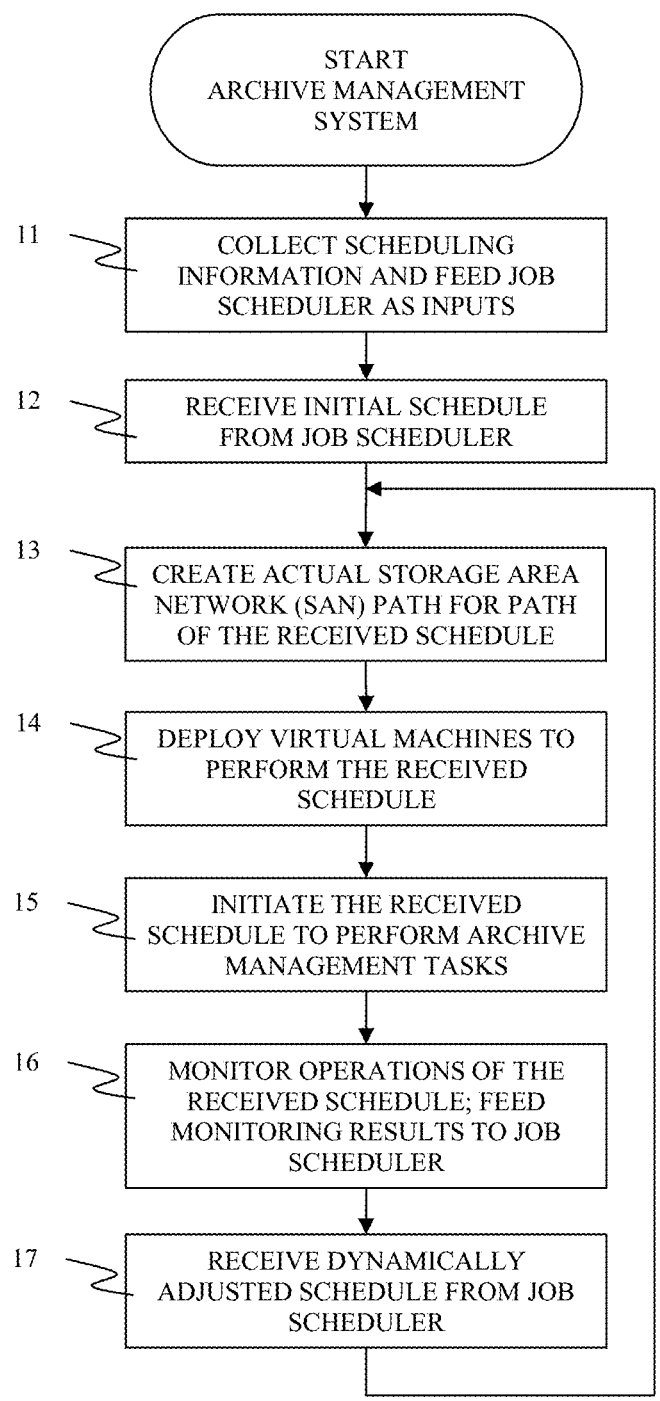
FIG. 2 is a flowchart depicting a method for continuously optimizing data archive management scheduling as performed by the archive management system of FIG. 1A, in accordance with the embodiments of the present invention.

FIG. 2 is a flowchart depicting a method for continuously optimizing data archive management scheduling as performed by the archive management system of FIG. 1A, supra, in accordance with the embodiments of the present invention.

In step 11, the archive management system collects information necessary for scheduling and provides the collected information to the job scheduler as the job scheduler inputs. In this specification, the terms "job scheduler inputs" and "inputs" are used interchangeably. The inputs describe application and data, collectively referred to as content, and computing and communication resources of the archive management system. The inputs comprise task information, replica placement data, infrastructure topology data, and resource performance data. See description of FIG. 1A, supra, for details of the infrastructure topology data.

Figure 3:
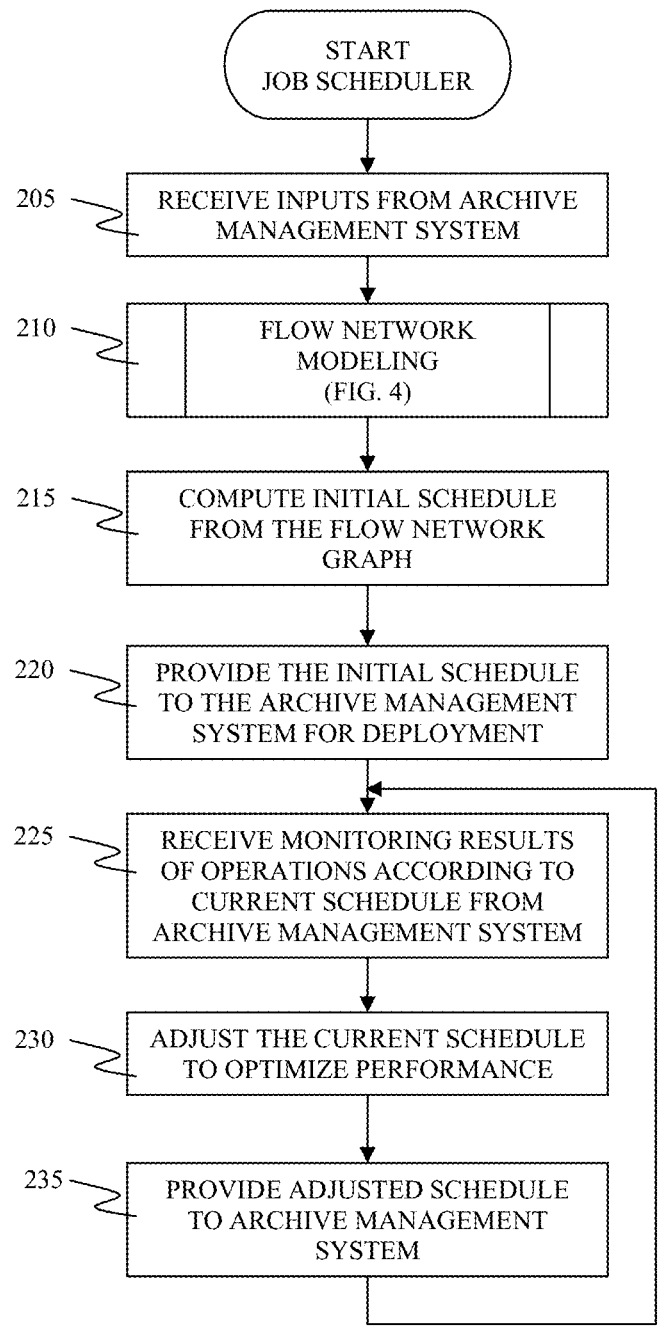
FIG. 3 is a flowchart depicting a method for creating an optimized data archive management schedule as performed by the job scheduler of the archive management system, in accordance with the embodiments of the present invention.

See description of steps 205 through 220 of FIG. 3, infra, for operations performed by the job scheduler in response to step 11 of FIG. 2. After performing step 11, the archive management system proceeds with step 12.

In one embodiment of the present invention, the archive management system is an IBM® Document Analysis and REcognition (DARE) system. The replica placement data is collected by a Disaster Recovery (DR) Orchestrator and the infrastructure topology data is retrieved from a TotalStorage® Productivity Center (TPC) database. The DR Orchestrator and the TPC database are components of a data archive of the IBM Document Analysis and REcognition (DARE) system. (IBM and TotalStorage are registered trademarks of International Business Machines, Corp. in the United States).

In step 12, the archive management system receives an initial schedule from the job scheduler in response to step 220 of FIG. 3, infra. Then the archive management system proceeds with step 13.

A loop of the archive management system comprising step 13 through step 17 is performed for each schedule that the archive management system received from the job scheduler.

In step 13, the archive management system creates at least one actual Storage Area Network (SAN) path to establish a data and control path between user interface and resources. The archive management system creates said at least one SAN path from paths of the flow network created by the job scheduler in step 210 of FIG. 3 infra, which indicate physical connectivity of resources. Then the archive management system proceeds with step 14.

In one embodiment of the present invention, the SAN path is created from server-storage-network resources of the IBM Document Analysis and REcognition (DARE) system to IBM TotalStorage Productivity Center (TPC) Web Application Programming Interface (API). In the same embodiment, a path from LEVEL_2 through LEVEL_6 in the flow network of FIG. 1B supra is transformed into a Volume-Server-Worker SAN path by use of zoning and masking User inputs provided through TPC Web API comprise zoning parameters <Initiator Port WWN, Fabric WWN, Target Port WWN> and masking parameters <Initiator Port WWN, Target Port WWN, Volume>.

In step 14, the archive management system deploys virtual machines to perform a received schedule. The received schedule is the initial schedule received in step 12 in a first iteration of the loop, and is an adjusted schedule received in step 17 in subsequent iterations of the loop. Each archive management task in the received schedule is assigned to a respective virtual machine for operation. In one embodiment of the present invention, the IBM Document Analysis and REcognition (DARE) system virtualizes the received schedule by deploying indexing virtual machines to VMware control. The archive management system proceeds with step 15.

In step 15, the archive management system initiates the received schedule to perform the archive management tasks. Then the archive management system proceeds with step 16.

In step 16, the archive management system monitors operations of the archive management tasks while performing the archive management tasks according to the received schedule. The archive management system provides monitoring results to the job scheduler. See description of steps 225 through 235 of FIG. 3, infra, for operations performed by the job scheduler in response to step 16 of FIG. 2. After performing step 16, the archive management system proceeds with step 17.

In step 17, the archive management system receives a dynamically adjusted schedule from the job scheduler in response to step 235 of FIG. 3, infra. Then the archive management system loops back to step 13 to process the adjusted schedule.

FIG. 3 is a flowchart depicting a method for creating an optimized data archive management schedule as performed by the job scheduler of the archive management system, in accordance with the embodiments of the present invention.

In step 205, the job scheduler receives scheduling information as inputs comprising task information, replica placement data, infrastructure topology data, and resource performance data from information collecting components of the archive management system, in response to step 11 of FIG. 2, supra. The infrastructure topology data is at least one quintuple <Hostname, Initiator Port WWN, Fabric WWN, Target Port WWN, Volume> that represents a respective possible path between a server Hostname and a storage device volume. The resource performance data comprises server clock speed, storage device clock speed, and data transfer rate between servers and storage devices. Then the job scheduler proceeds with step 210.

In one embodiment of the present invention, the job scheduler invokes a web service call requesting the task information for a set of tasks to be scheduled to the archive management system when a job comprising the set of tasks is ready for processing. See description of FIG. 1A supra for elements of the task information.

In step 210, the job scheduler creates a flow network by use of the inputs. The flow network is an embodiment of the content-resource analytics model of FIG. 1A supra that represents both content and resource of the archive management system. The flow network models uniform and unrelated parallel machines. An optimal mapping in the flow network corresponds to an optimal scheduling solution in terms of time to perform archive management tasks. See steps 305 through 320 of FIG. 4, infra, for steps creating the flow network. Then the job scheduler proceeds with step 215.

In one embodiment of the present invention, the job scheduler employs three basic assumptions. A first assumption is that each task takes a unit amount of processing time regardless of characteristics of workload for respective tasks, which may be either computation bound or data operation bound. The first assumption means that all tasks has uniform throughput. The first assumption prevents max flow computation of step 215 infra from arbitrarily splitting task groups. A second assumption is that all performance input can be aggregated as a static achievable throughput of tasks per unit time. A third assumption is that each task has a binary value indicating whether or not the task can be processed at a replicated volume.

In step 215, the job scheduler computes an initial schedule that is an optimal static mapping in the flow network by use of max flow computation. The optimal static mapping is a path from LEVEL_1 to LEVEL_6 with a minimum capacity value within the flow network. After step 215, the job scheduler proceeds with step 220.

Step 215 comprises multiple sub-steps. First, the job scheduler multiplies a factor of time, denoted as T, on a respective weight of each edge that represents throughput of resources, which is Edge(LEVEL_2, LEVEL_3), Edge (LEVEL_3, LEVEL_4) or Edge(LEVEL_4, LEVEL_5). Second, the job scheduler rounds down each result of the multiplication to a closest integer value and adjust capacity of said each edge. Third, the job scheduler performs a series of max flow computations on the flow network with the adjusted capacity of said each edge. If a max flow resulting from a max flow computation is equal to a total number of tasks, denoted as N, then all N tasks can be completed within time T. Fourth, the job scheduler generates candidate schedules from paths of the flow network. Fifth, the job scheduler searches the candidate schedules that also can complete all N tasks to find a schedule with a smallest time value T*, which is an optimal schedule.

In one embodiment of the present invention, the job scheduler employs Edmonds-Karp algorithm to compute max flows. In the same embodiment, the job scheduler employs binary search to search the candidate schedules for the optimal schedule.

In one embodiment of the present invention, an upper bound value for time to compute the optimal schedule is the total number of tasks multiplied by a primary volume capacity, that is (N×$Capacity_{primary}$), based on that all tasks can be performed on a primary volume for a respective task. In another embodiment of the present invention, the upper bound for time to compute the optimal schedule is a maximum value among values equal to the total number of tasks multiplied by a volume capacity, that is $MAX_{k=1 \ldots N}$(N× $Capacity_{volume\_k}$), which generalizes any volume that may be selected for the tasks.

The job scheduler may optimize step 215 with various techniques. A first optimization technique is task aggregation, for which each vertex in LEVEL_1 represent a task set instead of an individual task. Capacity of respective edges from LEVEL_1 through LEVEL_3, comprising all edges (LEVEL_1, LEVEL_2) and edge(LEVEL_2, LEVEL_3), is set to a value equal to the number of tasks in the task set. Each volume in LEVEL_2 and LEVEL_3 has a respective timestamp such that said each volume keeps up-to-date copies of all files modified prior to the time of the respective timestamp. With task aggregation and volume timestamps, the number of task sets is equal to the number of volumes. When both task sets and volumes are ordered by processing time to complete each task set, there is a mapping from the i-th task set to only j-th volumes for (j≤i), wherein i and j are positive integers. Because task aggregation reduces the number of vertices and edges, the job scheduler spends less time computing the optimal schedule in step 215.

A second optimization of step 215 is minimum cost method in which a schedule with a smallest number of worker-volume mappings is selected as the optimal schedule. Subsequent to obtaining the smallest time value T*, the job scheduler runs a min-cost max flow algorithm where each incoming edge to a volume vertex in LEVEL_2 has a cost value. As a result, the job scheduler finds the optimal schedule that satisfy both the smallest time value T* and the smallest number of worker-volume mappings.

In step 220, the job scheduler provides the initial schedule to the archive management system for deployment. See descriptions of steps 12 through 16 of FIG. 2, supra, for operations of the archive management system performed in response to step 220 of FIG. 3. Then the job scheduler proceeds with step 225.

A loop of the job scheduler comprising step 225 through step 235 is performed for each schedule that the job scheduler creates for continuous optimization.

In step 225, the job scheduler receives monitoring results of operations performed by a current schedule. The current schedule is the initial schedule computed in step 215 in a first iteration of the loop, and is an adjusted schedule computed in step 235 in subsequent iterations of the loop. Then the job scheduler proceeds with step 230.

In step 230, the job scheduler adjusts the current schedule per monitoring results received in step 225 to optimize performance. Then the job scheduler proceeds with step 235.

In contrast with the initial schedule in step 215 that is static and optimal based on the three basic assumptions about behaviors of the archive management system, the job scheduler in step 230 utilizes heuristics to dynamically optimize the current schedule according to actual performance monitoring results of the current schedule. The job scheduler assigns a respective capacity to each task in LEVEL_1 to reflect individuality of said each task in terms of amount of resource required to perform the task, throughput of the task, etc, based on metrics obtained from the performance monitoring data such as size of files in the task, etc. The job scheduler employs heuristics for optimization because monitoring result that represents past behavior of the archive management system is not enough to predict future behavior of the archive management system.

In first iteration of the loop adjusting the initial schedule, the job scheduler translates the initial schedule that is static into a dynamic set of operations according to current conditions of the archive management system. The job scheduler puts a group of tasks in a central repository and schedules each task on-demand when a worker has resources available. The tasks in the group assigned to the worker are ordered according to a predefined heuristic metric, and once the worker acquires necessary resources to perform a task and demands a new task, a first task with a highest heuristic metric is scheduled. Examples of heuristic metrics may be, inter alia, capacity of a task, out-degree of a task, total volume load, minimum volume load, etc. The capacity of the task is computed dynamically or statically according to metrics comprising file lengths. The out-degree of the task indicates a number of volumes that can be employed to perform the task. Wherein a first task has a larger out-degree than a second task, it is more likely for the job scheduler to choose the first task sooner than the second task. The total volume load denotes a cumulative load on all volumes that may handle the task. The total volume load is same as a sum of in-degrees of all volumes connected to the task in the flow network. Wherein a first task has a smaller total volume load than a second task, it is more likely for the job scheduler to choose the first task sooner than the second task. The minimum volume load denotes a load on a least loaded volume that may handle the task. The minimum volume load is same as a smallest in-degree of all volumes connected to the task in the flow network. Wherein a first task has a smaller minimum volume load than a second task, it is more likely for the job scheduler to choose the first task sooner than the second task. Both heuristic metrics and system performance can be updated dynamically according to feedback from the system.

In step 235, the job scheduler provides the adjusted schedule from step 230 to archive management system. Then the job scheduler loops back to step 225 to continuously and dynamically optimize performance of the adjusted schedule.

FIG. 4 is a flowchart depicting a method for creating a flow network as an embodiment of the content-resource analytic model, which is performed by the job scheduler in step 210 of FIG. 3, supra, in accordance with the embodiments of the present invention.

The flow network is defined as a directed graph in which each edge has a capacity that limits the amount of flow that pass through each edge. Vertices of the flow network comprise a source that has only outgoing flows and a sink that has only incoming flows. Any vertices between the source and the sink have a respective incoming flow and outgoing flow. Flow networks are typically used to model road traffic system, fluid in pipes, currents in an electrical circuit, data traffic travels through a network of nodes, etc. In one embodiment of the present invention, conventional graph libraries that support computation algorithms such as Edmonds-Karp max flow computation are utilizes for the flow network modeling. Examples of conventional graph libraries may be, inter alia, the Java® Universal Network/Graph (JUNG) Framework, LEMON open source graph library, and the Boost Graph Library (BGL), etc. (Java is a registered trademark of Sun Microsystems, Inc. in the United States)

In step 305, the job scheduler creates setup vertices in each level of the flow network model per respective vertex definition for LEVEL_1 to LEVEL_6 according to the definitions of FIG. 1B supra. Then the job scheduler proceeds with step 310.

In step 310, the job scheduler creates directed edges from vertices of LEVEL_k to vertices of LEVEL_k+1 per respective edge definition Edge(LEVEL_k, LEVEL_k+1), wherein k=1 . . . 5. Then the job scheduler proceeds with step 315.

In step 315, the job scheduler assigns capacity of a respective edge for all edges created in step 310 per capacity definition respective to Edge(LEVEL_k, LEVEL_k+1), wherein k=1 . . . 5. Then the job scheduler proceeds with step 320.

In step 320, the job scheduler creates a path in the flow network from tasks in LEVEL_1 to workers in LEVEL_6 that represent a job schedule to perform the tasks in LEVEL_1 by use of volumes in LEVEL_2 and LEVEL_3, servers in LEVEL_4 and LEVEL_5, and workers in LEVEL_6.

Figure 5:
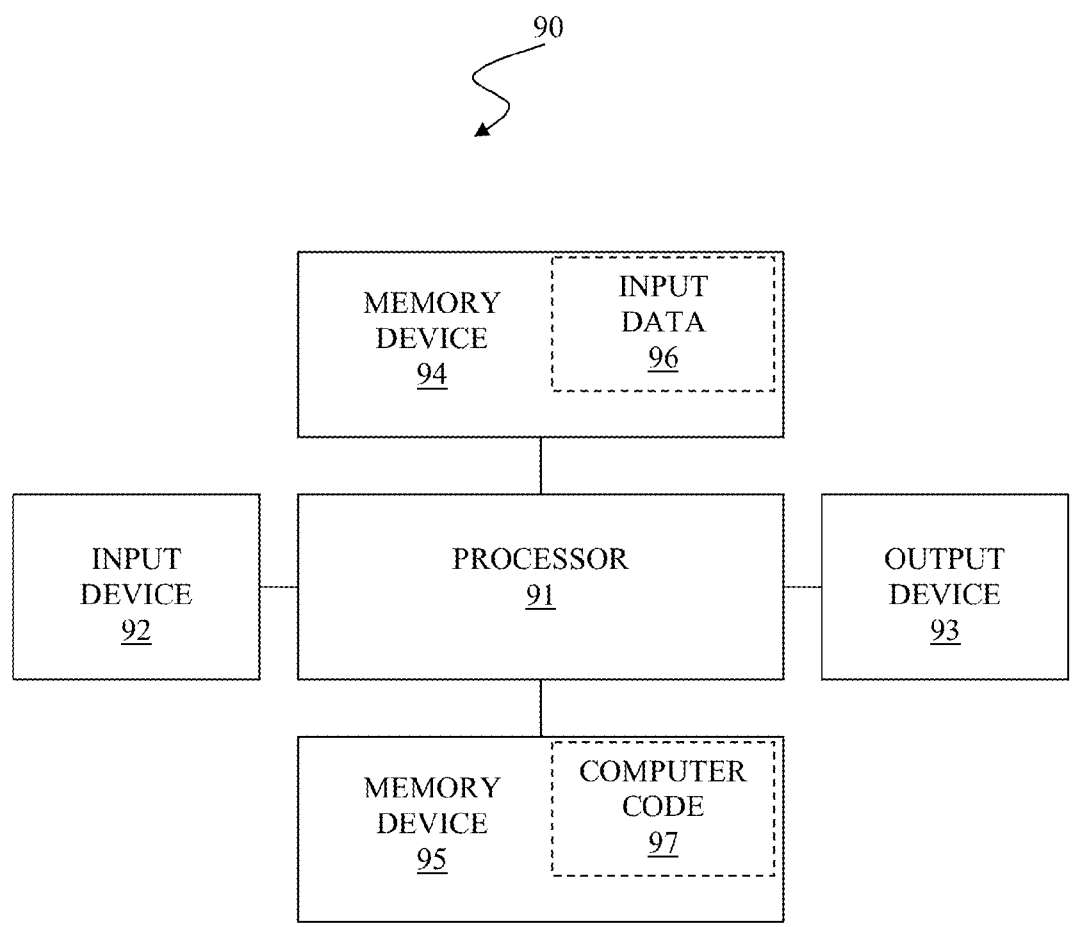
FIG. 5 illustrates a computer system 90 used for continuously optimizing data archive management scheduling, in accordance with the embodiments of the present invention.

FIG. 5 illustrates a computer system 90 used for continuously optimizing data archive management scheduling, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for continuously optimizing data archive management scheduling according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for dynamically building a web interface per data collecting rules of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for continuously optimizing data archive management scheduling.

In another embodiment, the invention provides a business method that performs the process steps of the invention on a subscription, advertising and/or fee basis. That is, a service provider, such as a Solution Integrator, can offer to create, maintain, support, etc. a process for continuously optimizing data archive management scheduling of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with an instruction running system, apparatus, or device.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing data archive management scheduling, said method comprising:

modeling, by a processor of a computer system, a flow network, wherein said modeling the flow network comprises creating vertexes organized in multiple levels and creating multiple edges sequentially connecting the vertexes of the multiple levels, wherein the multiple levels consist of N+1 levels denoted as $LEVEL_0$, $LEVEL_1$, . . . , $LEVEL_N$, wherein N is at least 2, wherein $LEVEL_0$ comprises a source vertex, wherein each level of $LEVEL_0$, $LEVEL_1$, . . . , $LEVEL_N$ comprises at least one task vertex associated with at least one archive management task, wherein $EDGE_K$ is directed from the vertex of $LEVEL_{K-1}$ to the vertex of $LEVEL_K$ for K=1, . . . , N, wherein $EDGE_1$ indicates that a first archive management task associated with a first task vertex of $LEVEL_1$ is scheduled by a job scheduler, and wherein $EDGE_1$ has a first weight equal to a time unit to perform the first archive management task, wherein an optimal path in the flow network represents an optimal initial schedule;

receiving, by the processor, monitoring results of operations of the optimal initial schedule for a worker program of the computer system, wherein the worker program performs archive management tasks according to the optimal initial schedule;

creating, by the processor, an adjusted schedule by dynamically optimizing a scheduling order of the archive management tasks based on the received monitoring results; and performing, by the worker program, the archive management tasks according to the adjusted schedule.

2. The method of claim 1, wherein the flow network represents data content, software programs, physical devices, and communication capacity of an archive management system.

3. The method of claim 1, wherein said modeling comprises modeling the flow network from task information, replica placement data, infrastructure topology data, and resource performance data.

4. The method of claim 1, said method further comprising:
after said creating vertexes and creating multiple edges, said processor creating at least one path from the source vertex to a sink vertex in $LEVEL_N$ such that the at least one path represents a respective job schedule for an archive management task in the at least one path by use of at least one storage device volume and at least one computing server in the at least one path to be performed by at least one worker program in the at least one path, wherein the optimal path is a path having a minimum sum of weights of edges in the at least one path.

5. The method of claim 1, said creating the adjusted schedule comprising:
analyzing new monitoring results of operations of the adjusted schedule, the new monitoring results comprising a respective amount of resources, a respective size of files, and a respective throughput of archive management tasks in the adjusted schedule;
applying results from said analyzing the new monitoring results to predefined heuristic metrics, wherein the predefined heuristic metrics are selected from the group consisting of a capacity of each archive management task, an out-degree of each archive management task, a total volume load, and a minimum volume load, and combinations thereof; and optimizing the adjusted schedule by dynamically adjusting a scheduling order of archive management tasks in the adjusted schedule based on results from said applying results.

6. The method of claim 1,
wherein N is at least 3,
wherein $LEVEL_2$ comprises at least one volume vertex associated with a storage device volume necessary to perform the at least one archive management task,
wherein $EDGE_2$ indicates that a first storage device volume associated with a first volume vertex of the at least one volume vertex comprised by $LEVEL_2$ stores latest data necessary to perform the first archive management task, and
wherein $EDGE_2$ has a second weight equal to a volume usage of the first archive management task.

7. The method of claim 6,
wherein N is at least 4,
wherein $LEVEL_3$ comprises the at least one volume vertex of $LEVEL_2$, and
wherein $EDGE_3$ has a third weight equal to a volume throughput of the first storage device volume indicating a number of archive management tasks that the first storage device volume can simultaneously support.

8. The method of claim 7,
wherein N=7,
wherein $LEVEL_4$ comprises at least one server vertex associated with a computing server necessary to perform the at least one the archive management task,
wherein $LEVEL_5$ comprises the at least one server vertex of $LEVEL_4$,
wherein $LEVEL_6$ comprises at least one worker vertex associated with at least one worker program that performs the at least one the archive management task,
wherein $LEVEL_7$ comprises a sink vertex,
wherein $EDGE_4$ comprises indicates that a first computing server associated with a first server vertex of the at least one server vertex is physically coupled to the first storage device volume,
wherein $EDGE_6$ indicates that a first computing server associated with the first server vertex hosts a first worker program associated with a first worker vertex of the at least one worker vertex,
wherein $EDGE_7$ indicates that the first worker program completes operations scheduled by a job scheduler,
wherein $EDGE_4$ has a fourth weight equal to a capacity of a communication channel between the first storage device volume and the first computing server, and
wherein $EDGE_5$ has a fifth weight equal to a processing throughput of the first computing server.

9. The method of claim 8, said computing the optimal initial schedule comprising:
calculating a respective time-factored weight of resource edges comprising $EDGE_3$, $EDGE_4$, and $EDGE_5$ as a result of multiplying a factor of time to a respective weight of the resource edges, and subsequently rounding down the multiplied respective weight to a respectively closest integer value;
obtaining at least one max flow by performing a series of max flow computations on the flow network with the respective time-factored weight of the resource edges;
selecting at least one candidate max flow from the obtained at least one max flow, wherein the at least one candidate max flow is equal to a total number of archive management tasks in the at least one max flow of the flow network;
generating at least one candidate schedule with the selected at least one candidate max flow; and
selecting the optimal initial schedule as a candidate schedule with a minimum sum of all weights in the candidate schedule among said at least one candidate schedule.

10. A computer program product, comprising a computer readable hardware storage device having computer readable program code stored therein, said program code configured to be executed by a processor of a computer system to implement a method for continuously data archive management scheduling, said method comprising:
modeling, by the processor, a flow network, wherein said modeling the flow network comprises creating vertexes organized in multiple levels and creating multiple edges sequentially connecting the vertexes of the multiple levels, wherein the multiple levels consist of N+1 levels denoted as $LEVEL_0$, $LEVEL_1$, ..., $LEVEL_N$, wherein N is at least 2, wherein $LEVEL_0$ comprises a source vertex, wherein each level of $LEVEL_0$, $LEVEL_1$, ..., $LEVEL_N$ comprises at least one task vertex associated with at least one archive management task, wherein $EDGE_K$ is directed from the vertex of $LEVEL_{K-1}$ to the vertex of $LEVEL_K$ for K=1, ..., N, wherein $EDGE_1$ indicates that a first archive management task associated with a first task vertex of $LEVEL_1$ is scheduled by a job scheduler, and wherein $EDGE_1$ has a first weight equal to a time unit to perform the first archive management task, wherein an optimal path in the flow network represents an optimal initial schedule;
receiving, by the processor, monitoring results of operations of the optimal initial schedule for a worker program of the computer system, wherein the worker program performs archive management tasks according to the optimal initial schedule;
creating, by the processor, an adjusted schedule by dynamically optimizing a scheduling order of the archive management tasks based on the received monitoring results; and
performing, by the worker program, the archive management tasks according to the adjusted schedule.

11. The computer program product of claim 10, wherein the flow network represents data content, software programs, physical devices, and communication capacity of an archive management system.

12. The computer program product of claim 10, wherein said modeling comprises modeling the flow network from task information, replica placement data, infrastructure topology data, and resource performance data.

13. A computer system comprising a processor, a memory coupled to the processor, and a computer readable storage device coupled to the processor, said storage device containing program code configured to be executed by the processor via the memory to implement a method for optimizing data archive management scheduling, said method comprising:
modeling, by the processor, a flow network, wherein said modeling the flow network comprises creating vertexes organized in multiple levels and creating multiple edges sequentially connecting the vertexes of the multiple levels, wherein the multiple levels consist of N+1 levels denoted as $LEVE_0$, $LEVEL_1$, ..., $LEVEL_N$, wherein N is at least 2, wherein $LEVEL_0$ comprises a source vertex, wherein each level of $LEVEL_0$, $LEVEL_1$, ..., $LEVEL_N$ comprises at least one task vertex associated with at least one archive management task, wherein $EDGE_K$ is directed from the vertex of $LEVEL_{K-1}$ to the vertex of $LEVEL_K$ for K=1, ..., N, wherein EDGE$_1$ indicates that a first archive management task associated with a first task vertex of LEVEL$_1$ is scheduled by a job scheduler, and wherein EDGE$_1$ has a first weight equal to a time unit to perform the first archive management task, wherein an optimal path in the flow network represents an optimal initial schedule;

receiving, by the processor, monitoring results of operations of the optimal initial schedule for a worker program of the computer system, wherein the worker program performs archive management tasks according to the optimal initial schedule;

creating, by the processor, an adjusted schedule by dynamically optimizing a scheduling order of the archive management tasks based on the received monitoring results; and performing, by the worker program, the archive management tasks according to the adjusted schedule.

14. The computer system of claim 13, wherein the flow network represents data content, software programs, physical devices, and communication capacity of an archive management system.

15. The computer system of claim 13, wherein said modeling comprises modeling the flow network from task information, replica placement data, infrastructure topology data, and resource performance data.

\* \* \* \* \*